(12) United States Patent
McColgan et al.

(10) Patent No.: US 12,554,786 B2
(45) Date of Patent: Feb. 17, 2026

(54) MATCHING SEARCH QUERIES TO APPLICATION CONTENT

(71) Applicant: Google LLC, Mountain View, CA (US)

(72) Inventors: Thomas McColgan, Dietikon (CH); Ana-Cristina Rogoz, Zurich (CH); Krishna Kanth Tatavarthi, Sunnyvale, CA (US); Vijay Thadkal, Sunnyvale, CA (US); Niraj Kumar, Milpitas, CA (US); Wuyuan Li, Sunnyvale, CA (US); Deepak Lukose, Lubbock, TX (US); Alexander Steven Flick, Brooklyn, NY (US); Timothy John Cherry, Mountain View, CA (US); Jeffrey R. Cooper, Mountain View, CA (US); Barbara Lugar, Zurich (CH)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/565,672

(22) PCT Filed: Mar. 21, 2023

(86) PCT No.: PCT/US2023/015759
§ 371 (c)(1),
(2) Date: Nov. 30, 2023

(87) PCT Pub. No.: WO2024/196354
PCT Pub. Date: Sep. 26, 2024

(65) Prior Publication Data
US 2025/0103663 A1    Mar. 27, 2025

(51) Int. Cl.
*G06F 16/9535* (2019.01)
*G06F 16/2457* (2019.01)

(52) U.S. Cl.
CPC .... *G06F 16/9535* (2019.01); *G06F 16/24578* (2019.01)

(58) Field of Classification Search
CPC ............... G06F 16/9535; G06F 16/24578
See application file for complete search history.

(56) References Cited

U.S. PATENT DOCUMENTS

| | | | |
|---|---|---|---|
| 10,310,834 B2* | 6/2019 | Lipton | G06F 9/445 |
| 10,649,621 B2* | 5/2020 | Kagan | H04L 67/025 |
| 11,537,671 B1* | 12/2022 | Gray | G06F 16/958 |

(Continued)

OTHER PUBLICATIONS

International Search Report and Written Opinion for International Application No. PCT/US2023/015759 dated Aug. 4, 2023. 13 pages.

*Primary Examiner* — Dangelino N Gortayo
(74) *Attorney, Agent, or Firm* — Lerner David LLP (57) ABSTRACT

The technology generally relates to providing search results that include a recommendation to install an application that can provide content relevant to the search query. A search query for content submitted by a user device may be received by a search server. The search server may identify an indexed web resource that satisfies the search query. The identified indexed web resource may be identified as being accessible by an application. The search server may determine the application is not installed on the user device. Based on determining the application is not installed on the user device, provide a link to an installation location for the application to the user device in response to the search query.

15 Claims, 7 Drawing Sheets

(56) References Cited

U.S. PATENT DOCUMENTS

| | | | |
|---|---|---|---|
| 2012/0124062 A1* | 5/2012 | Macbeth | G06F 16/9538 |
| | | | 707/E17.084 |
| 2014/0040226 A1 | 2/2014 | Sadhukha et al. | |
| 2016/0179956 A1* | 6/2016 | Sogani | G06F 3/0482 |
| | | | 707/722 |
| 2016/0188708 A1* | 6/2016 | Glover | G06F 16/9535 |
| | | | 707/722 |
| 2016/0253422 A1* | 9/2016 | Shapira | G06F 16/9537 |
| | | | 707/706 |
| 2017/0061017 A1 | 3/2017 | Lim et al. | |

* cited by examiner

MATCHING SEARCH QUERIES TO APPLICATION CONTENT

CROSS-REFERENCE TO RELATED APPLICATION

The present application is a national phase entry under 35 U.S.C. § 371 of International Application No. PCT/US2023/015759 filed Mar. 21, 2023, which is incorporated herein by reference.

BACKGROUND

Many content providers offer applications, such as mobile apps, that serve content, such as videos, music, text, etc., to users. However, the content available through these applications is often unavailable to search engines, as the search engines are unable to index content available via the applications. As such, search engines are unable to provide search results that include applications that can provide content relevant to the search queries being handled by the search engines.

BRIEF SUMMARY

One aspect of the disclosure is directed to a method. The method may include: receiving, by one or more processors from a user device, a search query for content, identifying, by the one or more processors, an indexed web resource that satisfies the search query, where the indexed web resource is identified as being accessible by an application, determining, by the one or more processors, the application is not installed on the user device, and providing, by the one or more processors and based on determining the application is not installed on the user device, a link to an installation location for the application to the user device.

The method may also include where the link is included in an advertisement for content within the indexed web resource that is relevant to the search query.

The method may also include further includes, providing, to the installed application, a deep link to the content.

The method may also include, where identifying the indexed web resource includes comparing the search query to a collection of indexed web resources to determine one or more relevant indexed web resources, ranking the one or more relevant indexed web resources, and selecting the most relevant index web resource as the indexed web resource that satisfies the search query.

The method may also include where the content includes at least one of media or products.

The method may also include where the advertisement includes text identifying the content within the indexed web resource that is relevant to the search query and the application.

The method may also include where comparing the search query to a collection of indexed web resources to determine one or more relevant indexed web resources includes determining a subset of indexed web resources within the collection of indexed web resources that match the language of the search query and are in a domain associated with the language.

The method may also include where determining the one or more relevant indexed web resources further includes determining whether indexed content associated with the subset of indexed web resources satisfies the search query.

The method may also include where the one or more relevant indexed web resources includes the web resources with indexed content that satisfies the search query.

Another aspect of the disclosure is directed to system. The system may include one or more processors and memory storing instructions that, when executed by the one or more processors, cause the one or more processors to: receive, from a user device, a search query for content, identify an indexed web resource that satisfies the search query, where the indexed web resource is identified as being accessible by an application, determine the application is not installed on the user device, and provide, based on determining the application is not installed on the user device, a link to an installation location for the application to the user device.

The system may also include where the link is included in an advertisement for content within the indexed web resource that is relevant to the search query.

The system may also include where the instructions further cause the one or more processors to provide, to the installed application, a deep link to the content.

The system may also include where identifying the indexed web resource includes comparing the search query to a collection of indexed web resources to determine one or more relevant indexed web resources, ranking the one or more relevant indexed web resources, and selecting the most relevant index web resource as the indexed web resource that satisfies the search query.

The system may also include where the content includes at least one of media or products.

The system may also include where the advertisement includes text identifying the content within the indexed web resource that is relevant to the search query and the application.

The system may also include where comparing the search query to a collection of indexed web resources to determine one or more relevant indexed web resources includes determining a subset of indexed web resources within the collection of indexed web resources that match the language of the search query and are in a domain associated with the language.

The system may also include where determining the one or more relevant indexed web resources further includes determining whether indexed content associated with the subset of indexed web resources satisfies the search query.

The system may also include where the one or more relevant indexed web resources includes the web resources with indexed content that satisfies the search query. Other technical features may be readily apparent to one skilled in the art from the following figures, descriptions, and claims.

Another aspect of the disclosure is directed to a non-transitory computer-readable storage medium, the computer-readable storage medium including instructions that when executed by a computer, cause the computer to: receive a search query for content, identify an indexed web resource that satisfies the search query, where the indexed web resource is identified as being accessible by an application, determine the application is not installed on the user device, and provide, based on determining the application is not installed on the user device, a link to an installation location for the application to the user device.

The computer-readable storage medium may also include where the link is included in an advertisement for content within the indexed web resource that is relevant to the search query.

Other technical features may be readily apparent to one skilled in the art from the following figures, descriptions, and claims.

DETAILED DESCRIPTION

The technology generally relates to providing search results that include a recommendation to install an application that can provide content relevant to the search query. In this regard, search services may identify web resources, such as web pages or other locations accessible via a network, that applications ("Apps") can directly access. Each web resource, and the contents therein, may be indexed in association with the respective application that can be used to access the web resource. When a search service receives a search query, the search service may determine that an indexed web resource accessible by an App matches the search query, such as by determining an indexed web resource accessible by the App contains content relevant to the search query. The search service may return a customized response to the search query that includes a link to a location where the App can be installed. After installation, the App may be opened and directed to the matched web resource.

Previously, search services would index an App's landing page within an application store ("App store"). This indexed landing page would be used for responding to search requests. Each landing page generally includes a short description of an app, such as the App's purpose and features available within the App. However, details about content available within such Apps, such as the names or titles of content, are not typically described on the landing page. As such, when identifying a response to a search query for content, a search service cannot usually determine whether the requested content is available in an App.

For example, a landing page of a "Music App" within an App store may describe "Music App" as "streaming the biggest hits in music." When a search service receives a search query for a "music streaming," the search service may determine "Music App" is a match based on the indexed description that describes a "streaming" app. However, when a search query for a particular song available on "Music App" is received, the search service may not provide results that include the Music App or the content available within the Music App corresponding to the particular song. The results do not include the Music App or the content available within the Music App because the index does not include data indicating the particular song is available on the Music App. Therefore the search service cannot determine the particular song is available through the Music App.

Another deficiency of previous search services is that creative text, such as advertiser-provided text corresponding to an advertisement for an available App, is typically set and cannot highlight all content available in the App. As such, when a search service serves the advertisement for the App in response to a search request for content available in the app, the advertisement does not highlight the content. As such, users may consider the advertisement irrelevant and ignore it.

Finally, Apps will typically show a generic starting screen after installation, even when a specific location that fulfills the intent of an original search query is present inside the App. For example, if a user submits a search query for particular content and installs an App returned in response to the search query, the App will load a generic start page. The user must then submit additional search queries within the App or navigate through many layers to access the content they originally searched for.

To address these deficiencies, the technology described herein provides techniques to enable search services to provide search results, including content available within Apps. Moreover, the technology described herein provides techniques to customize the creative text that identifies searched-for content in a search response. Such features may provide a way for application publishers to entice users to install the publishers' Apps, thereby increasing the Apps' respective user bases.

The technology further provides techniques to direct an App directly to the searched for content after installation, thereby bypassing the App's generic starting screen. By doing such, unnecessary processing and bandwidth usage may be avoided, as the App can avoid providing the starting screen and responding to additional requests from the user device to provide the searched for content.

Figure 1A:
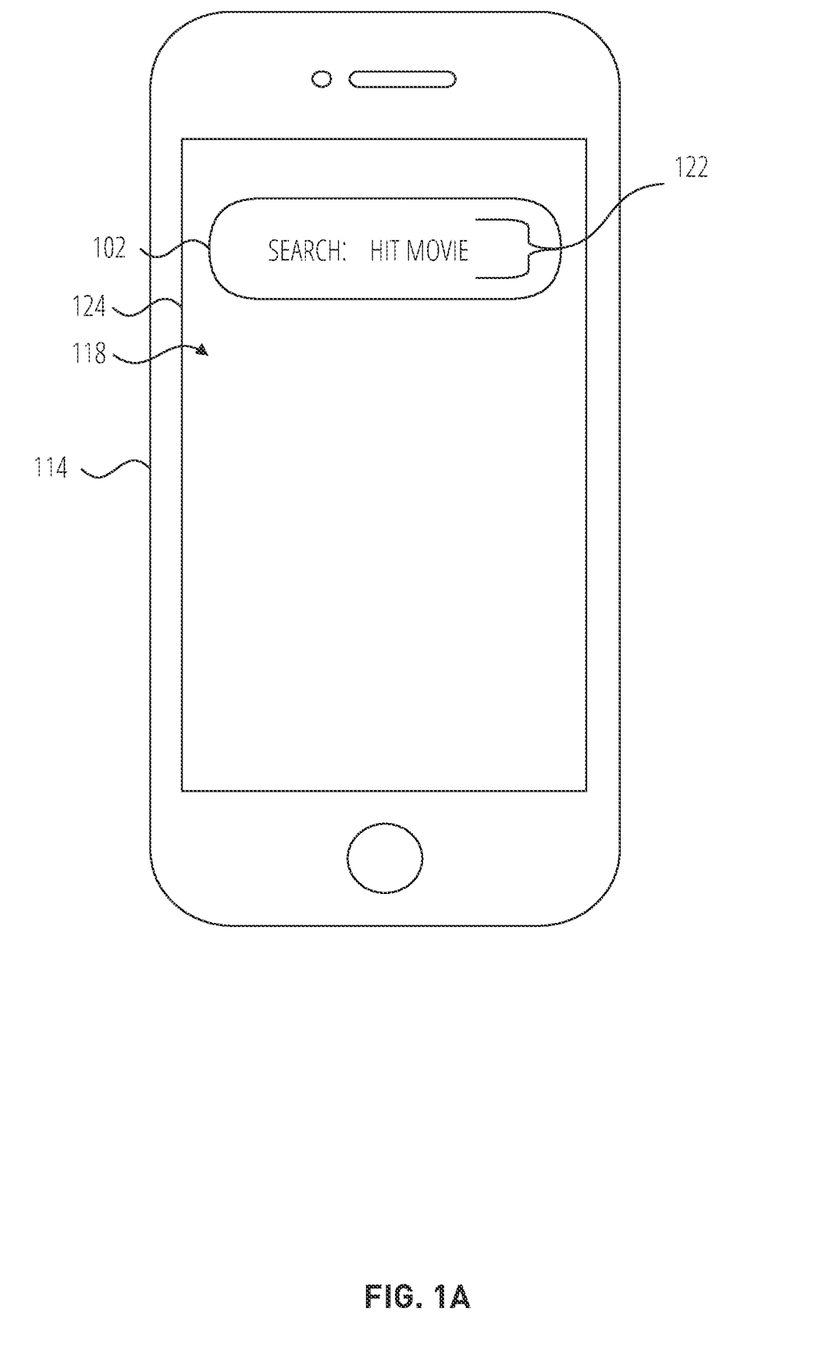
FIG. 1A illustrates a search interface for receiving a search query on a user device in accordance with aspects of the disclosure.
Figure 1B:
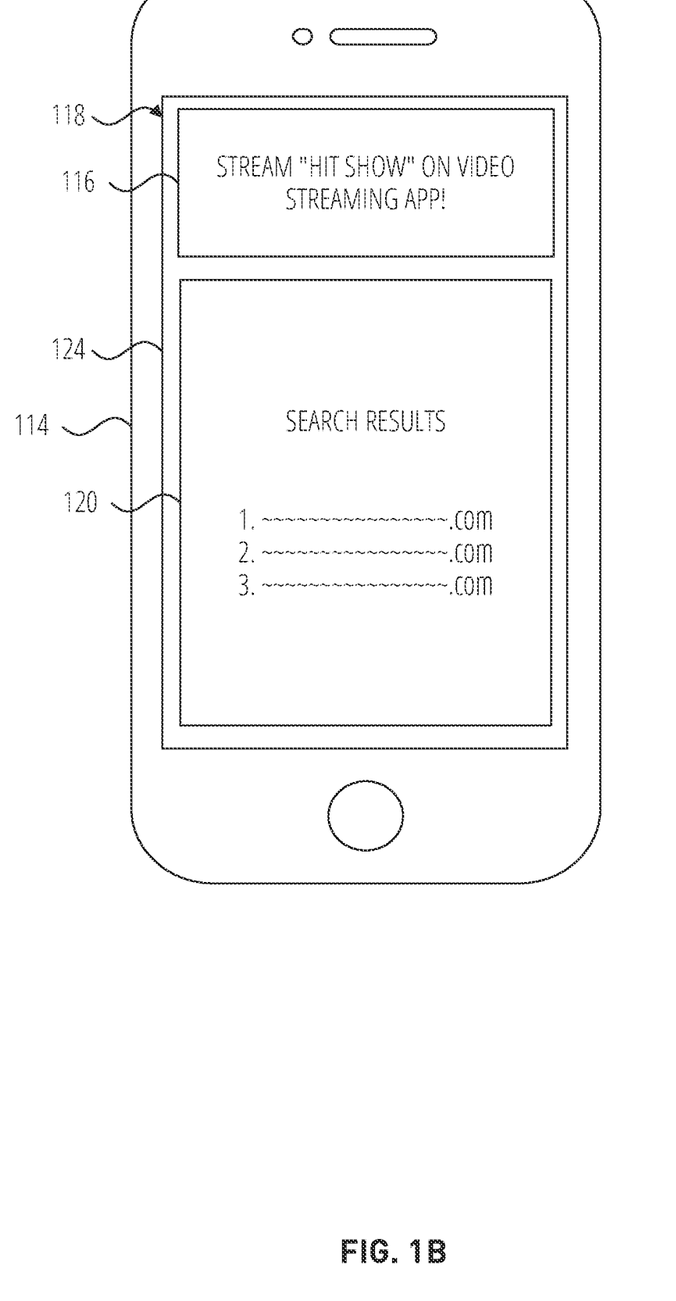
FIG. 1B illustrates a search result interface for providing responses to search query on a user device in accordance with aspects of the disclosure.

FIG. 1A and FIG. 1B illustrate an example implementation of the technology described herein. As shown in FIG. 1A, a user may enter a search query 122 for content including a "Hit Show" into an input box 102 or other such interface element, presented in interface 118 on display 124. The interface 118 may be a search website operated by a search service, a search bar in an operating system, or any other such application where users can submit queries for (or about) content.

Once the entered search query 122 is submitted, the search query 122 may be transmitted by the user device 114 to a search service. Based on the search query 122 and indexed web resources, the search service may determine that "Hit Show" is available on the "Video Streaming App." The search service may also determine, based on information corresponding to an account associated with the user and/or user device 114, that the "Video Streaming App" is not installed on the user's device.

After determining that "Hit Show" is available on the "Video Streaming App" and that "Video Streaming App" is not installed on the user's device, the search service may return, a customized response for the "Video Streaming App" and the "Hit Show." Customized responses may include text, images, video, and/or multimedia that provide an indication that the App identified by the search provider in response to a search query for content is capable of providing the requested content. For example, and as illustrated in FIG. 1B, search service may return customized response 116, which is output in the interface 118 on display 124 of user device 114. The customized response 116 identifies the App ("Video Streaming App") and provides an indication that the "Video Streaming App" can "Stream 'Hit Show'." The search service may also provide a general response to the search query, such as query response 120, in addition to the customized response 116. The query response 120 includes search results, such as web pages or other such locations, the search service identifies as including content relevant to the search query 122.

The customized response 116 may include a link to a location where the user may download and install the identified App to the user device 114. In this regard, the customized response 116 may be a selectable link, which can direct the user device, such as through an application executing on the device, to a location where the Video Streaming App may be downloaded. The location may be an application store or other such locations where Apps can be installed from. For example, customized response 116 may be linked to a page within an App store where the Video Streaming App may be downloaded. The text or other imagery of the customized response 116 may be dependent on the content searched for in the search query. For instance, and as shown in FIG. 1B, the text of customized response 116 includes "Hit Show." In other examples, the customized response may include imagery associated with the content, such as album covers, screenshots, posters, or any other such imagery.

Figure 1C:
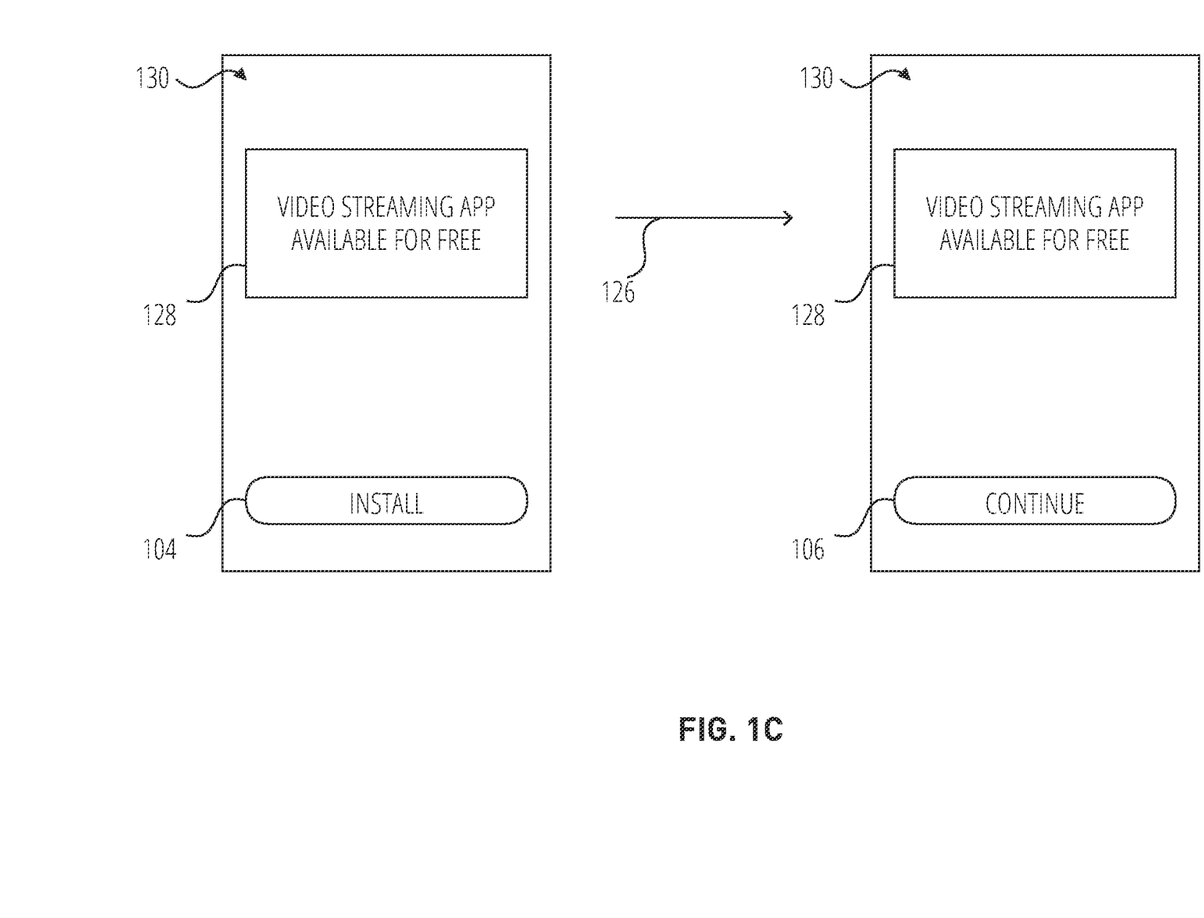
FIG. 1C illustrates an app store interface in accordance with aspects of the disclosure.

FIG. 1C illustrates an example of an App store interface 130, including a landing page where the Video Streaming App may be downloaded. As with typical landing pages, the landing page of the App store interface 130 includes app information 128 that provides a general description of the Video Streaming App, and an install button 104 by way of which the Video Streaming App may be installed. When an input selecting the install button 104 is received, such as a selection by a user via user device 114, the install button 104 may cause the user device 114 to download and install the Video Streaming App. In some instances, the contents of the landing page of the App may include other details, such as user comments, reviews, user guides or other data related to the App. As previously discussed, data on the landing page of the App may be used by typical search services to index the App. However, such data does not provide any details as to the content available within the App.

Once the Video Streaming App is downloaded and installed, the App store interface 130 may be updated, as illustrated by arrow 126, such that the install button 104 switches to a continue button 106. It will be understood that the install button 104 and continue button 106 are merely examples, and other buttons or interface elements may be used, as may other descriptors such as "download" instead of "install" and "let's go" instead of "continue."

Once an input indicating the selection of the continue button 106 is received, such as by a selection by a user via user device 114, the user device may open the Video Streaming App 132 directly to the content identified in response to the search query 122. By directing the Video Streaming App 132 directly to the content identified in response to the search query 134, the generic starting page (or other such location) of the Video Streaming App 132 is bypassed. As such, both time, bandwidth, and processing power may be saved. In this regard, a user will not be required to search through the Video Streaming App 132 to find the content identified in response to the search query 134. Moreover, the publisher server 218, described herein, will not be required to respond to the user's searches and provide unwanted content. Instead, the publisher server 218 can direct the Video Streaming App 132 directly to the content, thereby bypassing unnecessary processing and bandwidth usage.

Figure 1D:
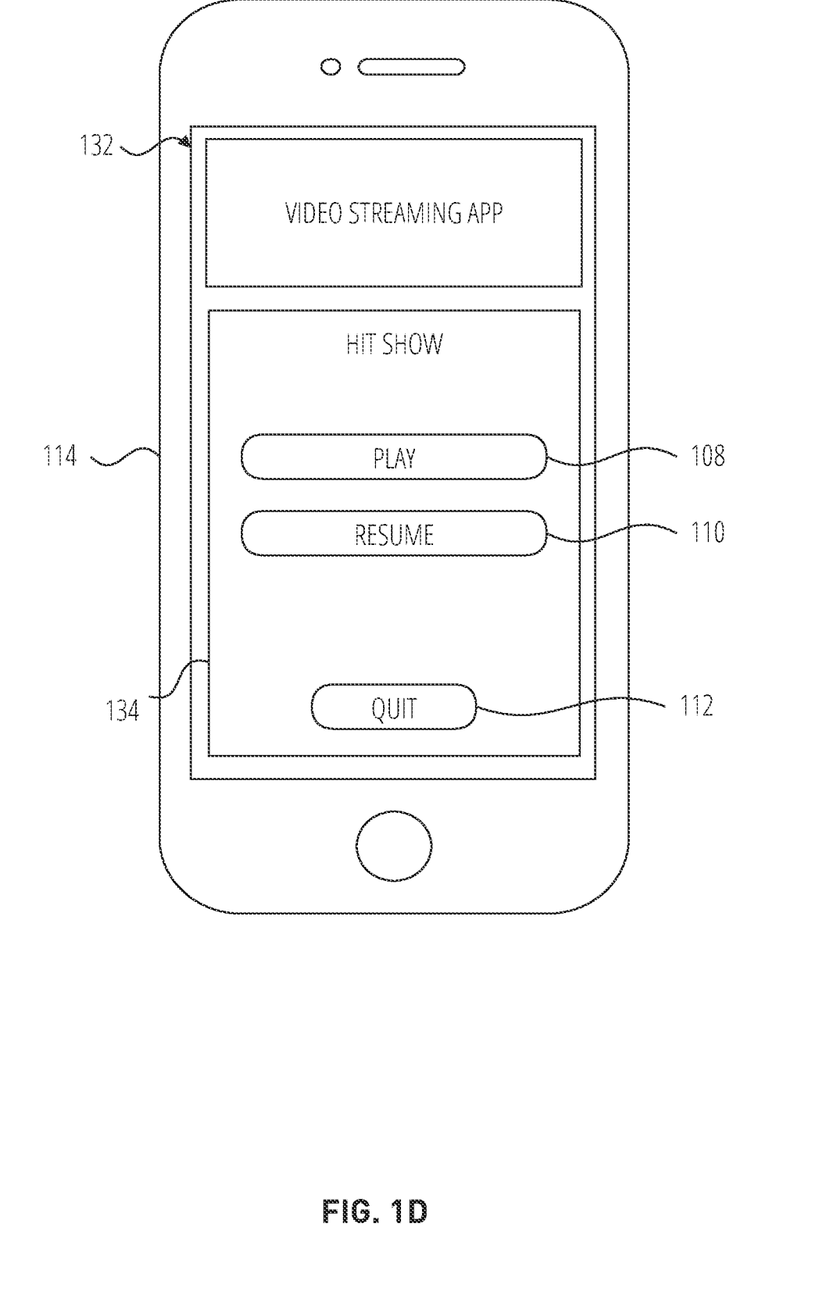
FIG. 1D illustrates an app interface in accordance with aspects of the disclosure.

The Video Streaming App 132 is illustrated in FIG. 1D as being displayed on user device 114. As shown, the Video Streaming App 132 opens the content identified in response to the search query 134-"Hit Show." From this portion of the Video Streaming App 132, a user may interact with the content by playing the content by selecting play button 108, resume playback of the content by selecting the resume button 110, or quit the Video Streaming App 132 by selecting quit button 112. Other interactions with the App may be possible, such as stopping, fast-forwarding, rewinding, etc., and those interactions shown are merely examples.

Figure 2:
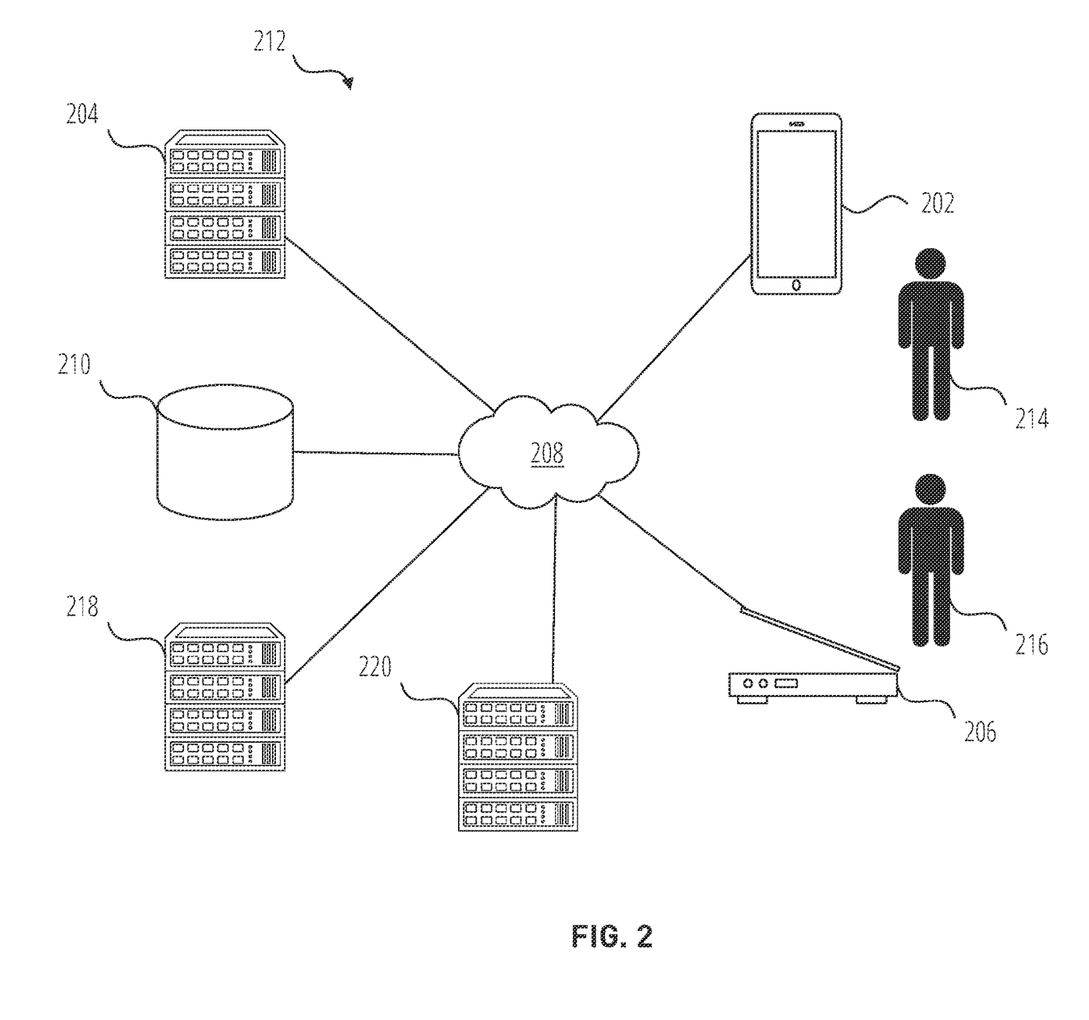
FIG. 2 illustrates a pictorial diagram illustrating an example system in which the features described herein may be implemented in accordance with aspects of the disclosure.

FIG. 2 is a pictorial diagram illustrating an example system 212 in which the features described herein may be implemented. System 212 may include web resource index storage system 210, as well as computing devices, including user device 202 and user device 206 (either of which may be compared to user device 114), and search server 204, publisher server 218, and advertiser server 220. As shown, the web resource index storage system 210, and computing devices can each be at different nodes of a network 208 and capable of directly and indirectly communicating with other nodes of network 208. Although only a few computing devices are depicted in FIG. 2, it should be appreciated that a typical system can include any number of connected computing devices, with each different computing device being at a different node of the network 208. For instance, system 212 may include hundreds, thousands, millions, or more or fewer user devices, and any number of servers, including search servers, publisher servers, and advertiser servers. Although FIG. 2 illustrates the advertiser server 220, publisher server 218, and search server 204 as being implemented on separate server computing devices, it should be understood that these servers may be implemented on the same server computing device or across multiple server computing devices. Likewise, there may be any number of web resource index storage systems.

The network 208 and intervening nodes on the network described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

The computing devices, including the servers 204, 218, 220, and user devices 202, 206 may each comprise a full-sized personal computing device, or may alternatively comprise mobile computing devices capable of wirelessly exchanging data with another server or user device, over a network such as network 208. For example, and as illustrated in FIG. 2, user device 202 may be a mobile device, such as a mobile phone, or some other mobile device such as a wireless-enabled PDA capable of being used by a user, such as user 214. As another example, user device 206 may be a laptop computer, or some other computing device such as a desktop computer, a tablet, or other smart device capable of being used by a user, such as user 216. In other examples (not shown), system 212 may additionally or alternatively include wearable devices, such as a smartwatch, a head mount device, etc.

Figure 3:
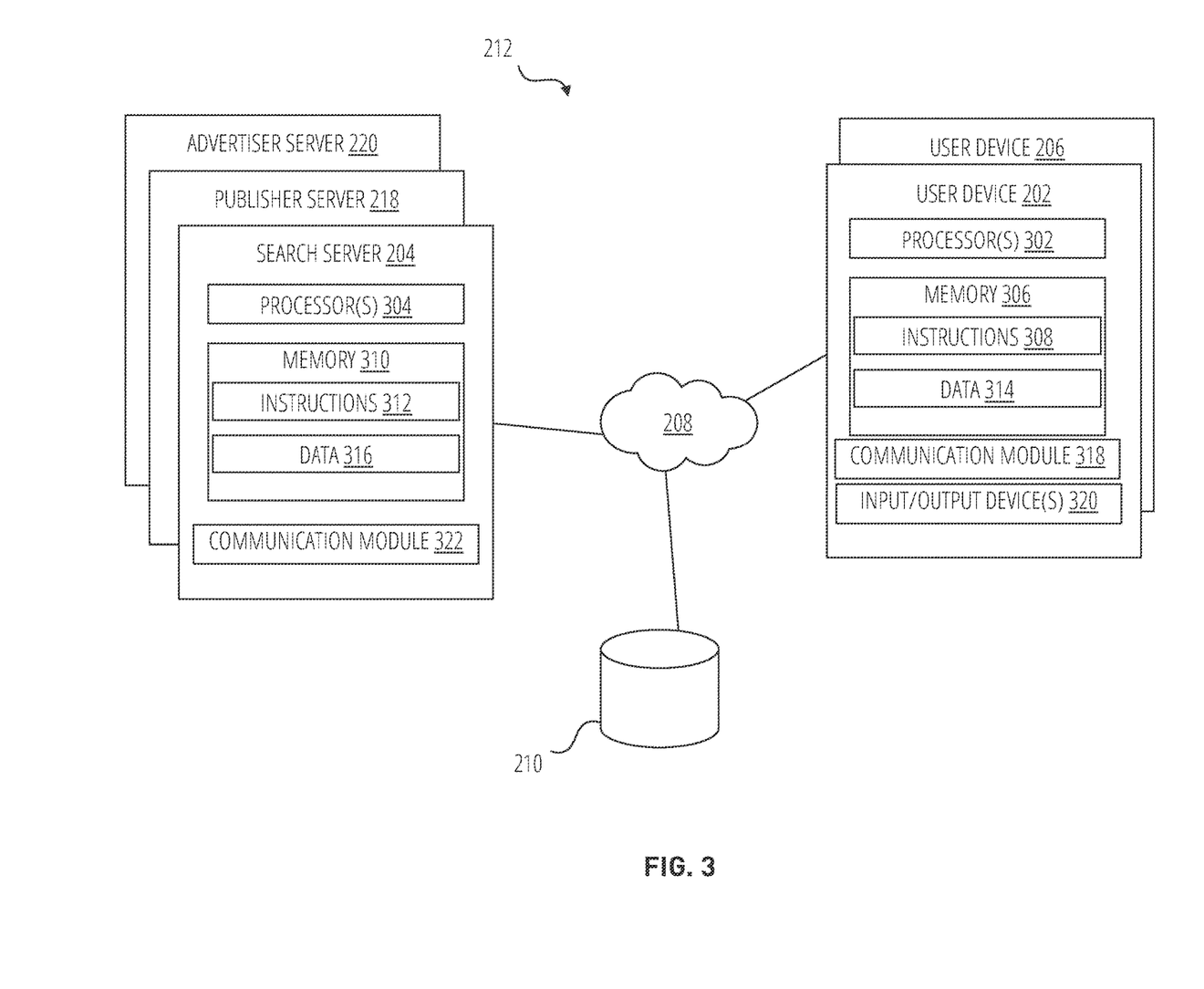
FIG. 3 illustrates a functional block diagram of the system of FIG. 2 in which the features described herein may be implemented in accordance with aspects of the disclosure.

FIG. 3 is a functional block diagram illustrating the components of system 212, in which techniques described herein may be implemented. FIG. 2 and FIG. 3 should not be considered as limiting the scope of the disclosure or usefulness of the features described herein. As shown in FIG. 3, search server 204 may contain components typically found in server computing devices, including one or more processors 304, memory 310, and communication modules 318. Although not shown, publisher server 218 and advertiser server 220 may include the same or similar components as described herein with regard to search server 204. User device 202 and user device 206 may include components typically present in general-purpose computing devices. For example, and as shown in FIG. 3, user device 202 includes one or more processors 302, memory 306, communication modules 318, and input/output devices 320. User device 206 may include the same or similar components as those described herein with regard to user device 202.

Memory 310, 306 may store information accessible by the one or more processors 304, 302, including instructions 312, 308, that can be executed by the one or more processors. Memory 310, 306 can also include data 316, 314 that can be retrieved, manipulated, stored, etc., by the processors 304, 302. The memory can be of any non-transitory type capable of storing information accessible by the processor, such as a hard-drive, memory card, ROM, RAM, DVD, CD-ROM, write-capable, and read-only memories.

The instructions 312, 308 can be any set of instructions to be executed directly, such as machine code, or indirectly, such as scripts, by the one or more processors. In that regard, the terms "instructions," "application(s)," "step(s)" and "program(s)" can be used interchangeably herein. The instructions can be stored in object code format for direct processing by a processor, or in any other computing device language including scripts or collections of independent source code modules that are interpreted on demand or compiled in advance. Functions, methods, and routines of the instructions are explained in more detail below. For instance, instructions 312 may include applications or scripts, or other such code, that, when executed by search server 204 cause the search server to index web resources, perform searches in response to queries, provide customized responses, and other such actions described herein as being performed by a server computing device. In another example, instructions 308 may include applications or scripts, or other such code, that, when executed by user device 202, cause the user device to submit search queries, install and execute applications (such as Apps,) etc.

Data 316, 314 can be retrieved, stored, modified, etc., by the one or more processors 304, 302 in accordance with the instructions 312, 308. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data. Data 316 may include indexed web resources, user profile data, etc.

The one or more processors 304, 302 can be any conventional processors, such as a commercially available CPU. Alternatively, the processors can be dedicated components such as an application specific integrated circuit ("ASIC") or other hardware-based processors. Although not necessary, the computing devices, including search server 204, publisher server 218, advertiser server 220, user device 202, and user device 206 may include specialized hardware components to perform specific computing processes, such as processing machine learning algorithms, or other such code faster or more efficiently.

Although FIG. 3 functionally illustrates the processors, memory, and other elements of search server 204 and user device 202 as being within the same block, the processors, memory, and other elements can actually comprise multiple processors, computers, computing devices, or memories that may or may not be stored within the same physical housing. For example, memory 310 can be a hard drive or other storage media located in housings different from that of the processor 304. Accordingly, references to a processor, computer, computing device, or memory will be understood to include references to a collection of processors, computers, computing devices, or memories that may or may not operate in parallel.

As further shown in FIG. 3, user device 202 may include one or more input/output devices 320. Input/output devices 320 may include, for instance, one or more speakers, transducers or other audio outputs, a user display, a haptic interface or other tactile feedback that provides non-visual and non-audible information to the user, keypads, keyboards, mouse, touchscreen, etc. For example, input/output devices 320 may be a touchscreen configured to display interfaces, such as interface 118, App store interface 130, and Video Streaming App 132. Although not shown, the server computing devices 204, 218, 220 may include one or more input/output devices.

Search server 204 and user device 202 may include communication modules, including communication modules 322 and 318, respectively. The communication modules may be configured to enable wireless network connections, wireless ad hoc connections, and/or wired connections. Via the communication modules 322, 318, the computing devices may establish communication links over the network, such as wireless links. The communication modules 322, 318 may be configured to support communication via cellular, LTE, 4G, 5G, 6G, Wi-Fi, GPS, and other networked architectures. The communication modules 230, 232 may be configured to support Bluetooth®, Bluetooth LE, near-field communications, and non-networked wireless arrangements. The communication modules 322, 318 may support wired connections such as a USB, micro USB, USB type C or other connector, for example to receive data and/or power from a laptop, tablet, smartphone or other device. Using the communication modules 322, 318 the pair computing devices may communicate with other devices via network 208.

Network slicing supports customizing the capacity and capabilities of a network for different services such as searching networks for web resources. Edge data center processing and local data center processing augments central data center processing to allocate 5G, 6G, and future network resources to enable user devices, including smartphones and wearables, as well as sensors and other wirelessly-connected devices.

Not only can terrestrial network equipment support searching for web resources, among many other services, non-terrestrial network equipment such as drones, satellites, and balloons can enable 5G, 6G, and future wireless communications in additional environments such as marine, rural, and other locations that experience inadequate base station coverage.

As support for searching networks for web resources., 5G, 6G, and future wireless networks enable fine range sensing and sub-meter precision localization. Leveraging massive bandwidths and wireless resource (time, frequency, space) sharing, these wireless networks enable simultaneous communications and sensing capabilities to support radar applications in user devices, such as those described herein, including but not limited to, smart displays, smartphones, wearables, etc., as well as sensors and other wirelessly-connected devices.

As with memory 310, 306, web resource index storage system 210 can be of any type of computerized storage capable of storing information accessible by one or more of the computing devices, such as search server 204 and user device 202. For instance, web resource index storage system 210 may include a hard-drive, memory card, ROM, RAM, DVD, CD-ROM, write-capable, and read-only memories. In addition, web resource index storage system 210 may include a distributed storage system where data is stored on a plurality of different storage devices, which may be physically located at the same or different geographic locations (across network 208.) In some instances, web resource index storage system 210 may be directly connected to a computing device. Web resource index storage system 210 may store indexed web resources, as described herein.

A search provider may index the content available within Apps to be able to provide the content in response to search queries. In this regard, the search provider, or another such party, may identify web resources that Apps can directly access. The web resources may be accessible via deep links, such as App Links or Universal Links (ULs). Each accessible web resource may be indexed and associated with the App or Apps that can open the deep links. The indexed web resources and associated App(s) may be stored in an index, such as web resource index storage system 210. The indexed results may be queried by a search provider when determining responses to search queries. Although the search provider is described as indexing the content, the indexing may be performed by a party different than the search provider.

To identify web pages that Apps can directly access, App publishers or other such parties may indicate or otherwise declare web resources that can be opened in respective Apps. Each indication may identify web resources, such as individual web pages, collections of individual web pages, a collection of web pages, domains, or sub-domains available to an App. For example, the publisher of Video Streaming App 132 may indicate that the domains videostreamingapp.com and videostreamingapp.de are accessible to Video Streaming App 132. Such indications may be used by a search service to identify web resources that Apps can directly accessed by Video Streaming App 132. Thus, when a search service receives a search query and determines that an indexed web resource accessible by Video Streaming App 132 matches the search query, the search service may return a result that provides a link to a location where the Video Streaming App 132 can be installed, such as an app store, as described herein with reference to FIG. 1C and FIG. 1D.

In some instances, a publisher or advertiser may provide a list of URLs, or other such web resources, that can be accessed by one or more Apps to a search service. The list of URLs may include general links or deep links and each URL may be associated with a particular App that can be used to access the respective URL. The search service may store this information in an index, such as the web resource index storage system 210. The information from the list of URLs could be queried by the search service in response to a search query to determine whether the content at URLs satisfy the search query and what App(s) can open the URL(s) that satisfies the search query.

Advertising campaigns may be set up to provide search results that drive App installations in response to searches for content provided by the App. For example, the publisher of Video Streaming App 132 may want to achieve a larger installation base through advertising. To do so, the publisher may set up a campaign (referred to herein as the "Streaming Campaign") to provide search responses that direct users to install Video Streaming App 132 in response to search queries for content provided by Video Streaming App 132.

To set up the campaign, the publisher of the Video Streaming App 132 or an advertiser on behalf of the publisher of the Video Streaming App 132 may instruct the search service to advertise the Video Streaming App 132, such as by providing parameters for the Streaming Campaign, such as user demographics, time period, number of creatives (e.g., advertisements), etc. The parameters may be provided by the publisher server 218, advertiser server 220, or other such computing devices. In instances where the advertiser or publisher provides a list of URLs, a parameter may be that the campaign is limited to the provided list of URLs.

In some instances, campaigns may include parameters directed to particular languages and/or locations. Additionally, campaigns may include parameters directed to historical spend. For instance, a publisher or advertiser may include a parameter that limits the campaign to a particular language. In another example, the publisher or advertiser may include a parameter that limits the campaign based on historical spend. Historical spend may refer to the total advertising amount spent on the campaign in a particular language and/or location. For instance, if campaign spend has mostly been directed to Spanish advertisements, the historical spend may indicate future advertisements of the campaign should be limited, or weighted towards, Spanish. Similarly, if the historical spend has mostly been in Spain, the historical spend may indicate future advertisements in the campaign should be mostly, or fully, directed to Spain.

In service, a search server, such as search server 204 may compare the search query to indexed web resources within a web resource index storage system, such as web resource index storage system 210, to determine whether content that is relevant to the search query is available from an App. Such relevant content and, in some instances the App(s) associated with the content, may be referred to herein as relevant resources. For example, if a search query for "Hit Show" is received by search server 204, search server 204 may review the indexed web resources within web resource index storage system 210 to determine whether an App can provide "Hit Show" or other content relevant to "Hit Show." Any identified web resources (and corresponding Apps) determined to include or otherwise be associated with content relevant to "Hit Show" may be considered a relevant resources.

The indexed web resources in the web resource index storage system 210 may be reduced by one or more criteria corresponding to the parameters of the campaign to reduce the number of indexed web resources that need to be reviewed to identify relevant resources. For instance, if a parameter limits a campaign to Spanish, the indexed web resources should be limited to those that serve Spanish speakers and have domains or web resource locations commonly used by Spanish-speaking users. By reducing the number of indexed web resources by one or more parameters, the processing necessary to return a customized response 116, described herein, may be reduced.

In another example, a search request for content in English may be compared to campaigns associated with English and available at .com domains, which are commonly accessed by English-speaking users. For instance, if a search query for "Hit Show" is received in English, the Streaming Campaign may be identified as relevant as the campaign is associated with English and a .com domain. Subsequently, an indexed web resource having content corresponding to the "Hit Show" and associated with the "Video Streaming App" may be determined as satisfying the search query. Such an indexed web resource may be considered a relevant resource. In some instances, other parameters associated with the campaign, such as location, demographics, etc., may be used to determine relevant resources.

In some examples, when more than one relevant resource is identified by the search service in response to a search query, the relevant resources may be ranked. In this regard, a subset of content within a web resource index storage system 210 may be identified as relevant to a search query. The subset of content may be ranked based on relevancy, and the most relevant content may be selected as the relevant resource. In some instances, multiple relevant resources may be selected.

A creative in accordance with the campaigns may be generated for the relevant resources. The creatives may link to the App capable of opening the relevant page within an App store. The creative may be customized and describe the App and contents of the indexed page. For example, and referring to FIG. 1B, the creative for "Video Streaming App," which is a banner advertisement in this example, may direct user device 114 to a location in the App store where the user device 114 may download and install "Video Streaming App" from. The text of the creative (referred to herein as a "customized response") may include customized text, such as "Stream 'Hit Show' on 'Video Streaming App.'" The format of the text may be configured based on the configuration of the campaign. For instance, a food delivery app may define the text as "Order food from [store name] on [name of food delivery app]." In some instances, the advertisement may only be provided if the user device from which the search query was received does not have the App installed.

In some instances, the format of a customized response may be based on a language parameter of a campaign or historical spend of a campaign. For example, if a campaign has mostly been targeted mainly to Spanish search queries, the search service may customize a response with Spanish text. In some instances, the search service may customize text of a creative based on location. For instance, a customized response to a search query from the United States may have a different customized response than a search query from England. Based on the determined language, a domain for the campaign may also be determined. For instance, if the highest historical spending for the Streaming Campaign occurs in English, the domain for the Streaming Campaign may be identified as ".com." In instances of a new campaign, the system may use a default domain or may use a domain with the most historical traffic.

In some examples, the App install process may be initiated by selecting to install an app at an App store by selecting a creative may be altered. For instance, a user selects a link within a creative to direct the user device to the App store, the user may select to install the App, as described herein with reference to FIG. 1C. After installation, the user may select another interface element to redirect the user device to the relevant location of the relevant content within the App, as further described herein with reference to FIG. 1C and FIG. 1D.

Figure 4:
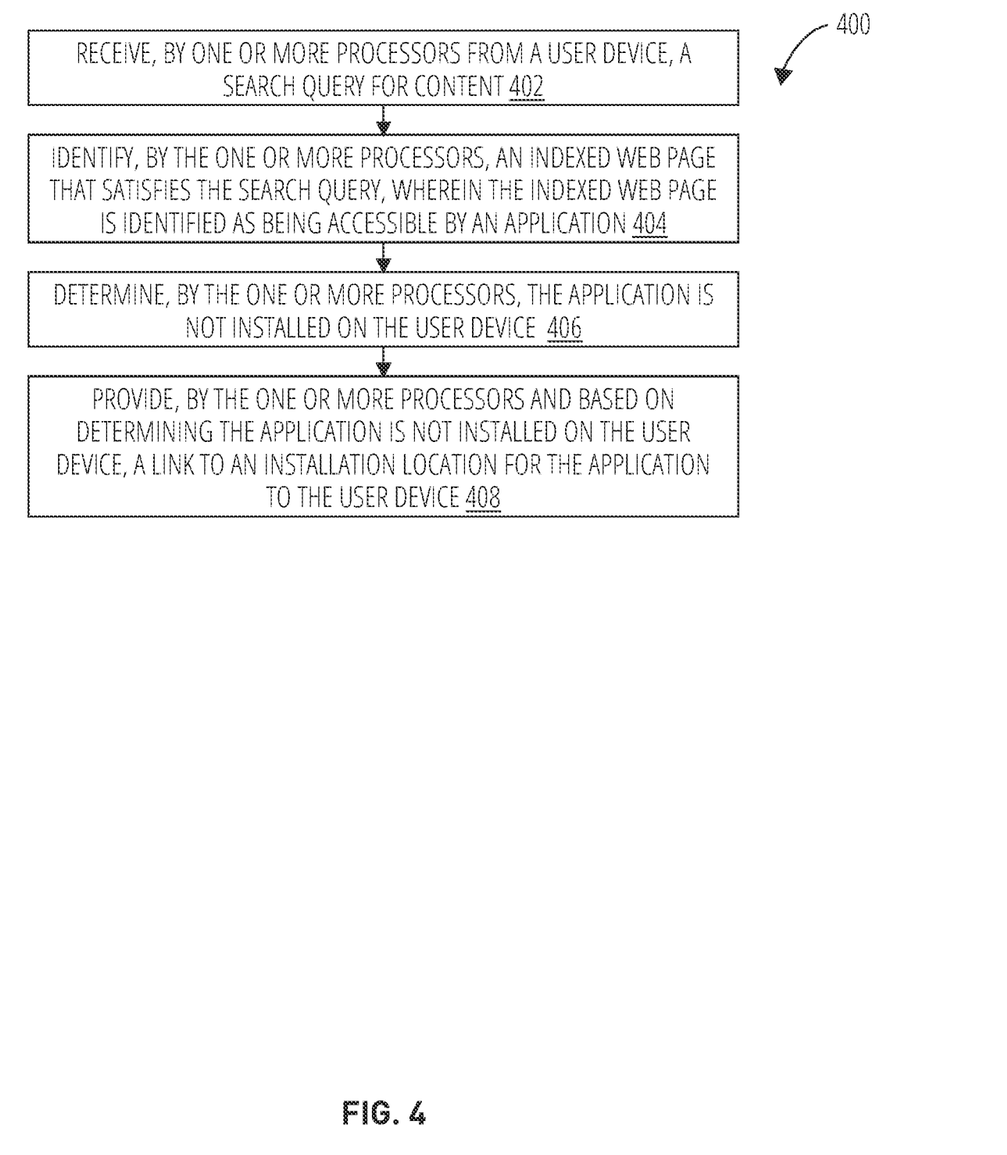
FIG. 4 illustrates a method for identifying an application that can provide content relevant to a search query in accordance with aspects of the disclosure.

FIG. 4 illustrates an example method 400 for finding an application that can provide content relevant to a search query. The following operations do not have to be performed in the precise order described below. Rather, various operations can be handled in a different order or simultaneously, and operations may be added or omitted. In block 402, a search server operated by a search service, such as search server 204 may receive a search query for content from a user device, such as user device 202. In block 404, the search server 204 may query a web resource index storage system, such as web resource index storage system 210 to identify an indexed web resource that satisfies the search query. The indexed web resource may be identified as being accessible by an application. In block 406, the search server 204 may determine the application is not installed on the user device. In block 408, the search server 204 may provide, based on determining the application is not installed on the user device, a link to an installation location for the application to the user device 204. In some instances, the link may be in the form of a customized response, which identifies content that is relevant to the search query and is available within the application.

Although the foregoing examples are described with reference to a video streaming App, the technology described herein may be implemented for any App that provides content, such as media or products, including, but not limited to travel Apps, restaurant booking Apps, shopping Apps, food ordering Apps, etc.

Unless otherwise stated, the foregoing alternative examples are not mutually exclusive but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

What is claimed is:

1. A method, comprising:
   receiving, by one or more processors from a user device, a search query for content, the search query being in a particular language;
   identifying, by the one or more processors, an indexed web resource that satisfies the search query by:
      reducing a collection of indexed web resources to a subset of indexed web resources based on the particular language of the search query;
      comparing the search query to the subset of indexed web resources to determine relevant indexed web resources; and
      selecting one or more of the relevant indexed web resources as the indexed web resource that satisfies the search query;
   determining, by the one or more processors and based on the indexed web resource, that the content is available in an application;

determining, by the one or more processors, that the application is not installed on the user device; and providing, by the one or more processors and based on determining the application is not installed on the user device, a customized response to the user device, the customized response comprising text identifying the content within the indexed web resource and a deep link to the content, the text being in the particular language of the search query and the deep link being a link that bypasses a starting page of the application.

2. The method of claim 1, wherein the link is included in an advertisement for the content within the indexed web resource that satisfies the search query.

3. The method of claim 1, wherein selecting one or more of the relevant indexed web resources further comprises ranking the relevant indexed web resources.

4. The method of claim 1, wherein reducing the collection of indexed web resources to a subset of indexed web resources is further based on a domain associated with the particular language of the search query.

5. The method of claim 1, wherein comparing the search query to the subset of indexed web resources further comprises determining whether indexed content associated with the subset of indexed web resources satisfies the search query.

6. The method of claim 5, wherein the relevant indexed web resources comprises web resources with indexed content that satisfies the search query.

7. The method of claim 1, wherein the content includes at least one of media or products.

8. A system comprising:
one or more processors; and
memory storing instructions that, when executed by the one or more processors, cause the one or more processors to:
receive, from a user device, a search query for content, the search query being in a particular language;
identify an indexed web resource that satisfies the search query by:
reducing a collection of indexed web resources to a subset of indexed web resources based on the particular language of the search query;
comparing the search query to the subset of indexed web resources to determine relevant indexed web resources; and
selecting one or more of the relevant indexed web resources as the indexed web resource that satisfies the search query;
determine, based on the indexed web resource, that the content is available in an application;
determine that the application is not installed on the user device; and
provide, based on determining the application is not installed on the user device, a customized response to the user device, the customized response comprising text identifying the content within the indexed web resource and a deep link to the content, the text being in the particular language of the search query and the deep link being a link that bypasses a starting page of the application.

9. The system of claim 8, wherein the link is included in an advertisement for the content within the indexed web resource that satisfies the search query.

10. The system of claim 8, wherein selecting one or more of the relevant indexed web resources further comprises ranking the relevant indexed web resources.

11. The system of claim 8, wherein reducing the collection of indexed web resources to a subset of indexed web resources is further based on a domain associated with the particular language of the search query.

12. The system of claim 8, wherein comparing the search query to the subset of indexed web resources further comprises determining whether indexed content associated with the subset of indexed web resources satisfies the search query.

13. The system of claim 12, wherein the relevant indexed web resources comprises web resources with indexed content that satisfies the search query.

14. The system of claim 8, wherein the content includes at least one of media or products.

15. A non-transitory computer-readable storage medium, the computer-readable storage medium including instructions that, when executed by a computer, cause the computer to:
receive, from a user device, a search query for content, the search query being in a particular language;
identify an indexed web resource that satisfies the search query by:
reducing a collection of indexed web resources to a subset of indexed web resources based on the particular language of the search query;
comparing the search query to the subset of indexed web resources to determine relevant indexed web resources; and
selecting one or more of the relevant indexed web resources as the indexed web resource that satisfies the search query;
determine, based on the indexed web resource, that the content is available in an application;
determine that the application is not installed on the user device; and
provide, based on determining the application is not installed on the user device, a customized response to the user device, the customized response comprising text identifying the content within the indexed web resource and a deep link to the content, the text being in the particular language of the search query and the deep link being a link that bypasses a starting page of the application.

* * * * *